United States Patent
Park

(10) Patent No.: US 11,964,592 B2
(45) Date of Patent: Apr. 23, 2024

(54) ELECTRIC-AXLE DEVICE FOR COMMERCIAL VEHICLE

(71) Applicants: Hyundai Motor Company, Seoul (KR); Kia Corporation, Seoul (KR)

(72) Inventor: Seong Hun Park, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 409 days.

(21) Appl. No.: 17/385,081

(22) Filed: Jul. 26, 2021

(65) Prior Publication Data

US 2022/0266697 A1 Aug. 25, 2022

(30) Foreign Application Priority Data

Feb. 19, 2021 (KR) .................. 10-2021-0022471

(51) Int. Cl.
*B60L 7/26* (2006.01)
*B60L 15/20* (2006.01)
(Continued)

(52) U.S. Cl.
CPC ............. *B60L 7/26* (2013.01); *B60L 15/2009* (2013.01); *B60W 10/08* (2013.01);
(Continued)

(58) Field of Classification Search
CPC .. B60L 7/26; B60L 15/2009; B60L 2240/425; B60L 2240/545; B60L 7/18; B60L 58/13; B60L 2240/507; B60L 7/10; B60L 15/2054; B60L 58/12; B60L 2260/24; F16D 27/112; F16D 2121/20; B60W 10/08; B60W 10/184; B60W 30/18127; B60W 2510/087; B60W 2510/244; B60W 2710/083; B60W 2710/088;
(Continued)

(56) References Cited

U.S. PATENT DOCUMENTS 2,209,980 A * 8/1940 Johnson .................... F16H 3/60
475/308
8,651,991 B1 * 2/2014 Sten ........................ F16H 48/30
475/204
(Continued)

FOREIGN PATENT DOCUMENTS

CN 109606096 A * 4/2019 ............... B60K 7/00
CN 111412230 A 7/2020
(Continued)

*Primary Examiner* — Tisha D Lewis
(74) *Attorney, Agent, or Firm* — MORGAN, LEWIS & BOCKIUS LLP

(57) ABSTRACT

An electric-axle device for a commercial vehicle that can minimize the frequency of using a main brake when braking, may include a first clutch device disposed between a motor and a differential casing to transmit or block power, a second clutch device disposed between the differential casing and a disc, an electromagnetic brake applying a braking force to the disc, and that can increase a coasting distance and improve energy efficiency and durability of the motor by disengaging the first clutch device and the second clutch device such that kinetic energy, which is transmitted to the motor from an axle shaft, is blocked as if a neutral gear of a transmission is engaged, when the vehicle coasts.

18 Claims, 7 Drawing Sheets

(51) Int. Cl.
  *B60W 10/08* (2006.01)
  *B60W 10/184* (2012.01)
  *B60W 30/18* (2012.01)

(52) U.S. Cl.
  CPC .... *B60W 10/184* (2013.01); *B60W 30/18127* (2013.01); *B60L 2240/425* (2013.01); *B60L 2240/545* (2013.01); *B60W 2510/087* (2013.01); *B60W 2510/244* (2013.01); *B60W 2710/083* (2013.01); *B60W 2710/088* (2013.01); *B60W 2710/18* (2013.01); *B60W 2710/244* (2013.01); *B60W 2710/246* (2013.01)

(58) Field of Classification Search
  CPC ....... B60W 2710/18; B60W 2710/244; B60W 2710/246; B60W 10/02; B60W 10/12; B60W 10/16; B60W 30/18136; B60W 2510/12; B60W 2710/12; F16H 57/037; B60K 1/00; B60K 17/02; B60K 17/16; B60K 26/02
  See application file for complete search history.

(56) References Cited

U.S. PATENT DOCUMENTS

| | | | |
|---|---|---|---|
| 2006/0240931 A1* | 10/2006 | Habel | B60K 17/16 475/150 |
| 2007/0062774 A1* | 3/2007 | Akagi | F16D 67/02 192/18 B |
| 2020/0189543 A1* | 6/2020 | Kurosaki | B60L 7/24 |
| 2020/0324635 A1 | 10/2020 | Barna | |

FOREIGN PATENT DOCUMENTS

| | | |
|---|---|---|
| JP | 5613412 B | 10/2014 |
| KR | 10-2009-0062860 A | 6/2009 |

\* cited by examiner

ELECTRIC-AXLE DEVICE FOR COMMERCIAL VEHICLE

CROSS REFERENCE TO RELATED APPLICATION

The present application claims priority to Korean Patent Application No. 10-2021-0022471, filed on Feb. 19, 2021, the entire contents of which is incorporated herein for all purposes by this reference.

BACKGROUND OF THE INVENTION

Field of the Invention

The present invention relates to an electric-axle device for a commercial vehicle, and more particularly, an electric-axle device for a commercial vehicle, the electric-axle device being able to minimize the frequency of using a main brake using an electromagnetic brake system and clutch system and being able to improve energy efficiency and the durability of a motor.

Description of Related Art

As eco-friendly vehicles such as an electric vehicle and fuel cell electric vehicle come into the market, an electric truck or a fuel cell electric vehicle provided with electric-axle assembly are being developed as a kind of eco-friendly commercial vehicles.

The electric-axle assembly may include an axle housing mounted on an axle shaft, a motor and a reducer (or a transmission mounted in the axle housing and outputting driving power to the axle shaft), etc.

When such eco-friendly vehicles are braked, regenerative braking of a motor and friction braking of a main brake (e.g., a hydraulic brake) are performed together in accordance with a predetermined distribution ratio of a braking force.

However, when the state of charge (SOC) value of a battery supplying power to the motor is full over a predetermined lever, when the battery temperature is high over an upper reference limit, or when the battery temperature is low under a lower reference limit, charging the battery by regenerative braking of the motor is limited so it may be impossible.

Accordingly, a method of converting and discharging electrical energy generated by regenerative braking of the motor into thermal energy using resistance of a resistor or electric accessories is applied.

However, the method of converting and discharging electrical energy into thermal energy using resistance of a resistor or electric accessories needs a separate cooling system due to heat generated by the resistor or electric accessories, so there is a problem that the manufacturing cost is increased.

Meanwhile, when a transmission is mounted between the motor and the axle shaft, kinetic energy transmitted to the motor through the neutral gear of the transmission is blocked, so regenerative braking of the motor may be limited.

However, when a reducer is mounted between the motor and the axle shaft, the method of converting and discharging electrical energy into thermal energy using resistance of a resistor or electric accessories is unavoidably applied and there is no separate disconnector that blocks power between the motor and the axle shaft, so there is a defect that the coasting distance becomes very short due to the resistance of the motor when the vehicle coasts.

Accordingly, when regenerative braking is limited, as described above, the amount of distribution of a braking force of the main brake such as a hydraulic brake is unavoidably increased to satisfy the braking force required by a driver and durability may be reduced due to frequent use of the main brake.

Furthermore, large commercial vehicles are provided with an auxiliary brake such as a hydraulic or electromagnetic retarder other than the main brake because of auxiliary braking laws, but the retarder, which is applied to an internal combustion engine, etc. cannot be applied to an electric-axle device, so an auxiliary brake for the electric-axle device is required.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an electric-axle device configured for a commercial vehicle, the electric-axle device being able to minimize the frequency of using a main brake in a process of braking, using a first clutch device mounted to be configured to transmit or block power between a motor and a differential casing, a second clutch device mounted between the differential casing and a disc, an electromagnetic brake applying a braking force to the disc, etc.

Various aspects of the present invention are to provide an electric-axle device configured for a commercial vehicle, the electric-axle device being able to remove resistance of a motor in coasting, to achieve an effect of improving energy efficiency by increasing the coasting distance, and to improve durability of a motor by blocking kinetic energy which is transmitted to the motor from an axle shaft as if the neutral gear of a transmission is engaged, by disengaging a first clutch device and a second clutch device when the vehicle coasts.

To achieve the objectives, various aspects of the present invention provide an electric-axle for a commercial vehicle that includes: a differential casing connected to an axle shaft; a motor selectively transmitting torque to the differential casing; a reducer disposed between the motor and the differential casing and engaged to the differential casing; a first clutch device mounted between the motor and the reducer and configured to selectively engage the motor to the reducer; a disc fixed to the differential casing to rotate with the differential casing; a second clutch device disposed between the disc and the differential casing and configured to selectively engage the disc to the differential casing; an electromagnetic brake configured for braking the disc, optionally with the second clutch device engaged; and a battery electrically connected to the motor to be charged by the motor or discharged to the motor, and electrically connected to the electromagnetic brake to be discharged to the electromagnetic brake.

The reducer may include an output gear engaged to an output shaft of the motor and a driving gear fixed on the differential casing and engaged with the output gear.

The first clutch device may include: a first needle bearing disposed at a center portion of the output gear of the reducer; an output shaft fixed to the motor and having an end portion inserted into the first needle bearing and having a first spline on an external surface of the output shaft; first fixed teeth formed on an internal surface of the output gear; a first clutch body having first moving teeth, which are engaged with the first fixed teeth, on an external surface, and fitted on the first spline to straightly move along the first spline; and a first actuator engaged to the first clutch body and configured to be selectively driven to straightly move the first clutch body along the first spline.

The second clutch device may include: a second needle bearing disposed at a center portion of the disc; a connection shaft having a first end portion integrated with the differential casing and a second end portion inserted into the second needle roller bearing and having a second spline on an external surface of the second end portion; second fixed teeth formed on an internal surface of the disc; a second clutch body having second moving teeth, which are engaged with the second fixed teeth, on an external surface thereof, and fitted on the second spline to straightly move; and a second actuator engaged to the second clutch body and selectively driven to straightly move the second clutch body along the second spline.

The electromagnetic brake may include: an electromagnetic portion partially fitted on an external surface of the disc and configured for selectively generating a magnetic field to brake the disc; and a current controller electrically connected to the electromagnetic portion and configured for supplying a current to the electromagnetic portion for generating the magnetic field in the electromagnetic portion using electrical energy generated by the motor or electrical energy of the battery.

The electric-axle device may further include a controller configured for controlling operation of the first clutch device and the second clutch device and controlling operation of the electromagnetic brake.

The controller may send a driving control signal for engaging the first clutch device to a first actuator and may send a driving control signal for disengaging the second clutch device to a second actuator, when the motor is operated for driving and performs regenerative braking.

The controller may send a driving control signal to the first actuator for engaging the first clutch device and may send a driving control signal to the second actuator for disengaging the second clutch device by the second actuator to operate the motor configured for driving when an accelerator pedal switch is turned on.

The controller may send a driving control signal to the first actuator for engaging the first clutch device and may send a driving control signal for disengaging the second clutch device to the second actuator for regenerative braking of the motor when an SOC value of the battery is less than a reference value and a battery temperature is less than a first reference temperature.

The controller may send a driving control signal for disengaging the first clutch device to a first actuator and may send a driving control signal for disengaging the second clutch device to a second actuator, when the vehicle coasts.

The controller may be configured to determine that the vehicle is coasting when receiving an off-signal of a brake pedal switch and an off-signal of an accelerator pedal switch.

The controller may send a driving control signal for engaging the first clutch device to a first actuator, may send a driving control signal for engaging the second clutch device to a second actuator, and may send a control signal for supplying electrical energy generated by the motor to an electromagnetic portion of the electromagnetic brake to a current controller, when the motor cannot perform regenerative braking, but can generate power in braking.

The controller may be configured to determine that the motor cannot perform regenerative braking but can generate power when an SOC value of the battery is equal to or greater than a reference value or a battery temperature is equal to or greater than a first reference temperature and a motor temperature is less than a second reference temperature.

The controller may send a driving control signal for disengaging the first clutch device to the first actuator, may send a driving control signal for engaging the second clutch device to the second actuator, and may send a control signal for supplying electrical energy of the battery to an electromagnetic portion of the electromagnetic brake to a current controller, when the motor cannot perform regenerative braking and cannot generate power in braking.

The controller may be configured to determine that the motor cannot perform regenerative braking and cannot generate power when an SOC value of the battery is equal to or greater than a reference value or a battery temperature is equal to or greater than a first reference temperature and a motor temperature is equal to or greater than a second reference temperature.

Various aspects of the present invention provide the following effects through the objectives described above.

First, when the motor cannot perform regenerative braking and cannot generate power while a vehicle is braked, the electromagnetic brake which is a kind of auxiliary brake performs braking, whereby the amount of braking for the main brake (e.g., hydraulic brake) may be decreased and the frequency of using the main brake may be minimized. Furthermore, the durability of the main brake and the brake pad may be increased.

Second, since the electrical energy generated by the motor may be consumed by the electromagnetic brake when the motor cannot perform regenerative braking to charge the battery, it is not required to use a resistor or electric accessories that are used generally, and accordingly, it is possible to increase the durability of the electric accessories.

Third, it is possible to remove resistance of a motor in coasting, to achieve an effect of improving energy efficiency by increasing the coasting distance, and to improve durability of a motor by blocking kinetic energy which is transmitted to the motor from an axle shaft as if the neutral gear of a transmission is engaged, by disengaging a first clutch device and a second clutch device when the vehicle coasts.

Fourth, since the electromagnetic brake mounted on the differential casing can perform the function of an auxiliary brake, it is possible to achieve an electric-axle device having an auxiliary brake.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
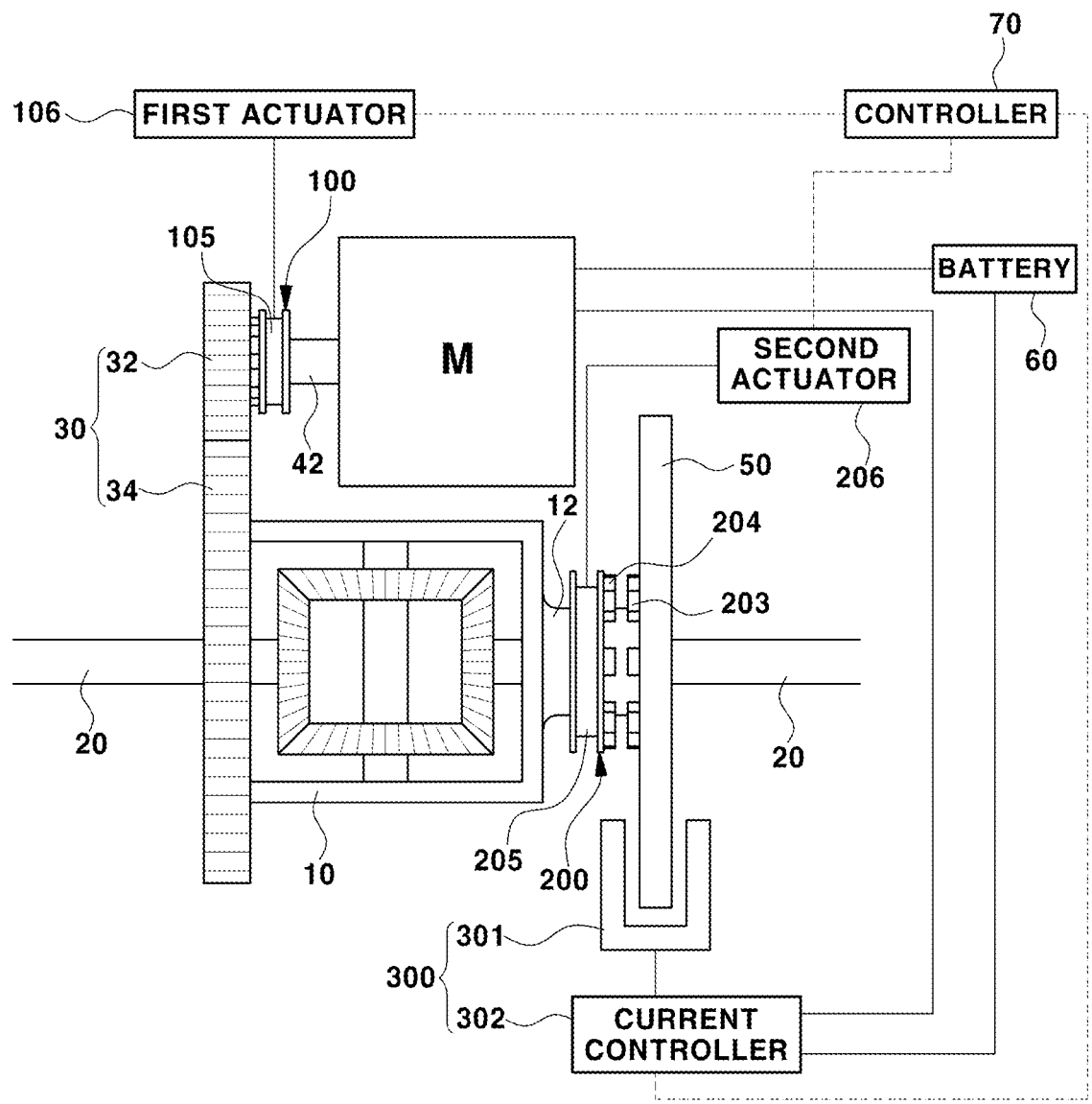
FIG. 1 is a view showing an electric-axle device configured for a commercial vehicle according to various exemplary embodiments of the present invention in which a first clutch device is engaged and a second clutch device is disengaged.
Figure 2:
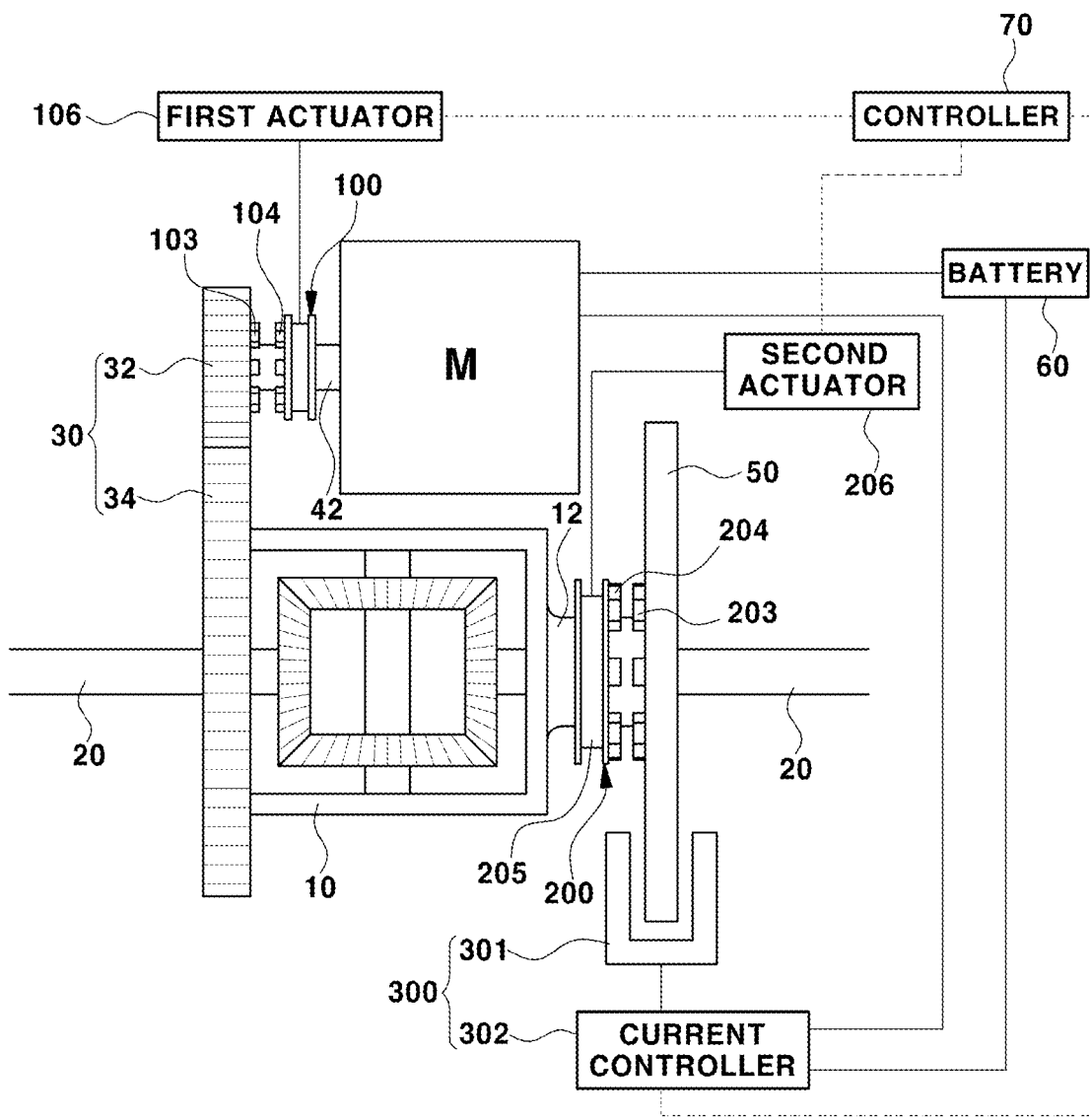
FIG. 2 is a view showing an electric-axle device configured for a commercial vehicle according to various exemplary embodiments of the present invention in which both of the first clutch device and the second clutch device are disengaged.
Figure 3:
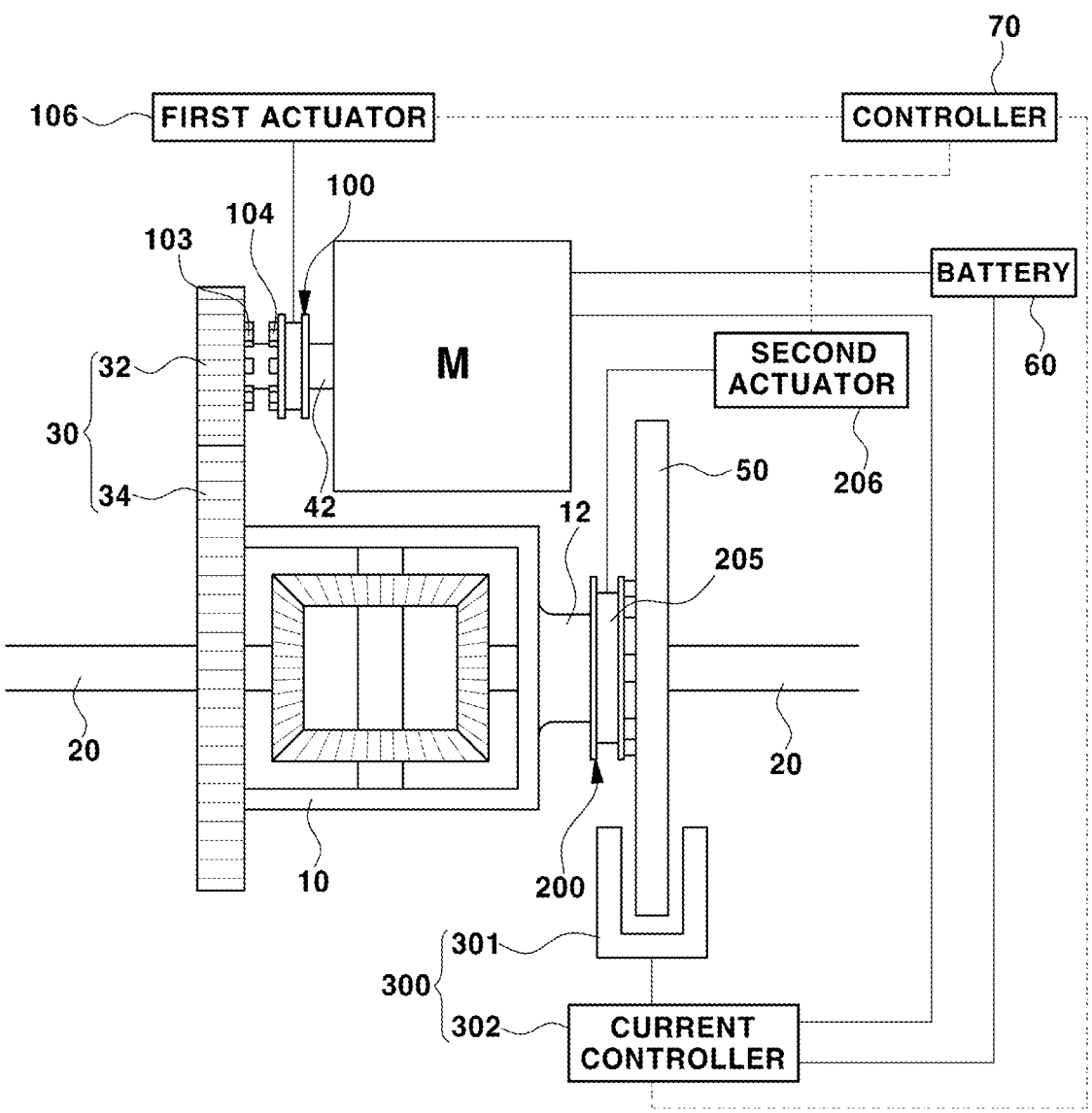
FIG. 3 is a view showing an electric-axle device configured for a commercial vehicle according to various exemplary embodiments of the present invention in which the first clutch device is disengaged and the second clutch device is engaged.
Figure 4:
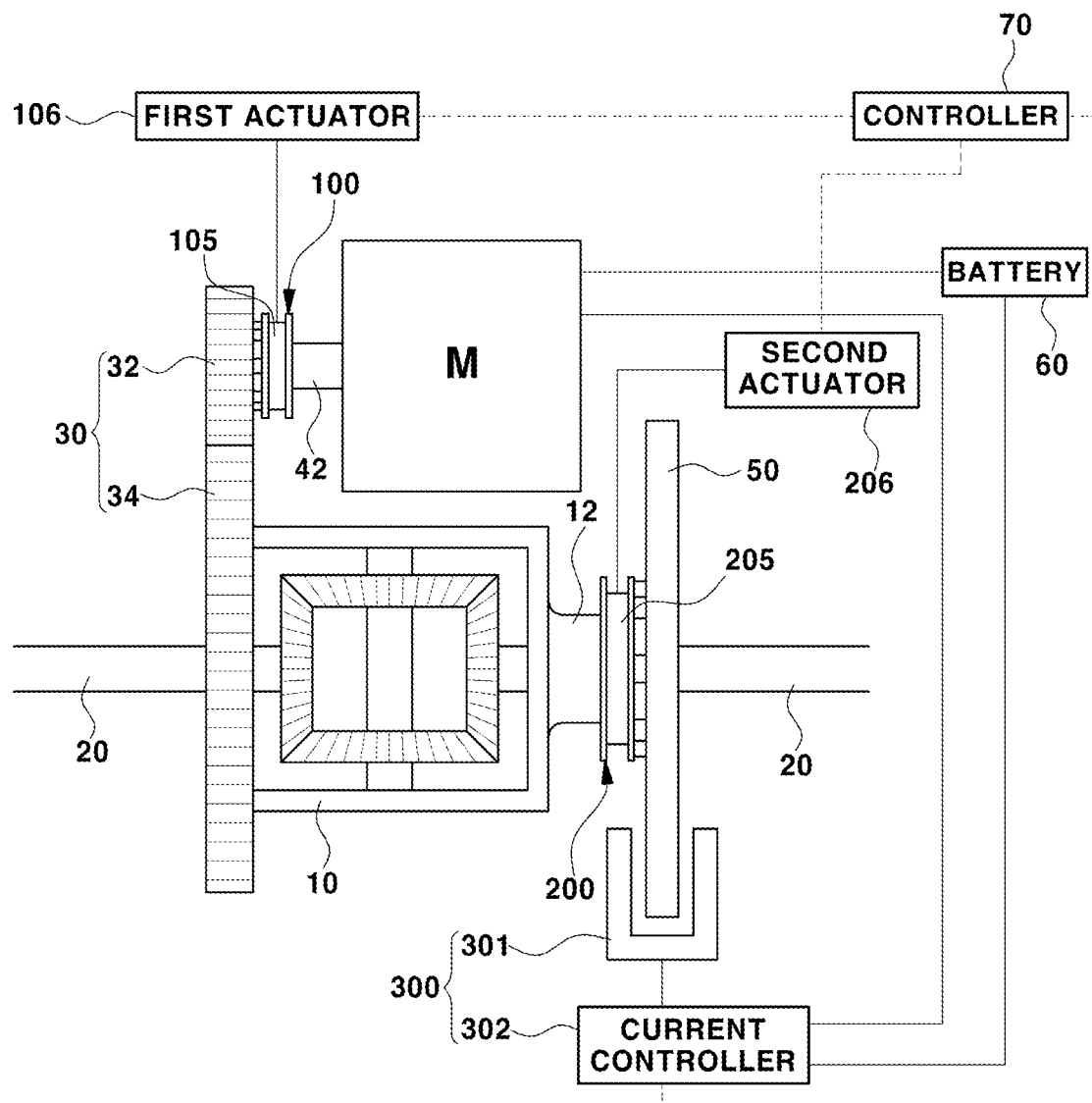
FIG. 4 is a view showing an electric-axle device configured for a commercial vehicle according to various exemplary embodiments of the present invention in which both of the first clutch device and the second clutch device are engaged.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings.

FIG. 1, FIG. 2, FIG. 3, and FIG. 4 show an electric-axle device configured for a commercial vehicle according to various exemplary embodiments of the present invention, in which reference numeral '10' indicates a differential casing.

Axle shafts 20 extending to left and right wheels are connected to both sides of the differential casing 10.

A motor M transmitting torque through a reducer 30 is connected to the differential casing 10.

The reducer 30 is disposed between the motor M and the differential casing 10 and may include an output gear 32 connected to an output shaft 42 of the motor and a driving gear 34 mounted on a first side of the differential casing 10 and engaged with the output gear 32.

A first clutch device 100 which may be engaged and disengaged is disposed between the motor M and the reducer 30 and may have a clutch structure called a dog clutch or a disconnector.

Figure 5:
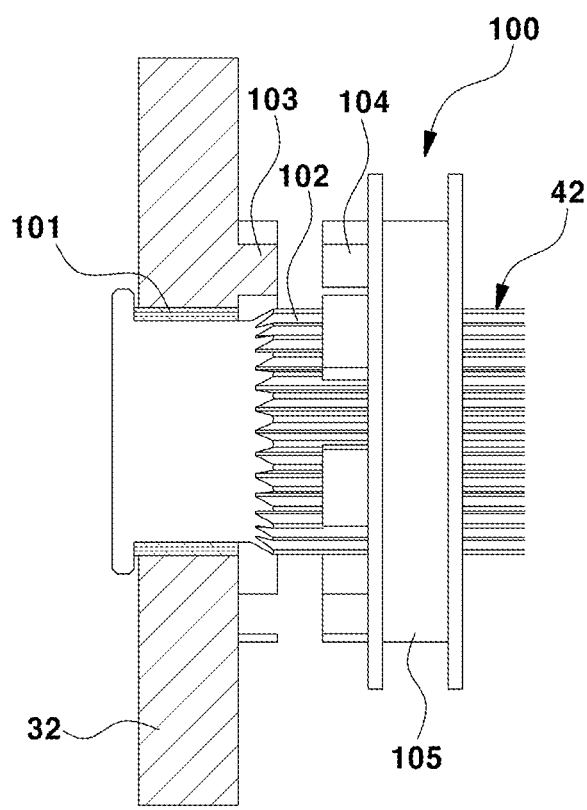
FIG. 5 is a cross-sectional view showing the first clutch device of the components of the electric-axle device configured for a commercial vehicle according to various exemplary embodiments of the present invention.

In more detail, the first clutch device 100, as shown in FIG. 5, includes: a first needle bearing 101 disposed at the center portion of the output gear 32 of the reducer 30; an output shaft 42 having an end portion inserted into the first needle bearing 101 and having a first spline 102 on the external surface; first fixed teeth 103 protruding on the internal surface of the output gear 32; a first clutch body 105 having first protrusive moving teeth 104 on the external surface, which may be engaged with the first fixed teeth 103, and fitted on the first spline 102 to be configured to straightly move.

A first actuator 106 which is driven to straightly move the first clutch body 105 is connected to the first clutch body 105.

Substantially, a plunger which is the output shaft of the first actuator 106 is connected to the first clutch body 105, so when the plunger is moved forward or backward by operation of the first actuator 106, the first clutch body 105 is also moved forward or backward thereof.

Accordingly, when the plunger of the first actuator 106 is moved forward, the first clutch body 105 is moved forward and the first moving teeth 104 of the first clutch body 105 are engaged with the first fixed teeth 103 of the output gear 32, whereby the first clutch device 100 may be engaged.

When the motor M is driven and the output shaft 42 is rotated with the first clutch device 100 engaged, the first clutch body 105 spline-coupled to the first spline 102 and the output gear 32 coupled to the first clutch body 105 are also rotated, whereby torque from the output gear 32 may be transmitted to the differential casing 10 through a driving gear 34.

On the other hand, when the plunger of the first actuator 106 is moved backward, the first clutch body 105 is moved backward and the first moving teeth 104 of the first clutch body 105 are disengaged from the first fixed teeth 103 of the output gear 32, whereby the first clutch device 100 may be disengaged.

Since the first moving teeth 104 of the first clutch body 105 have been disengaged from the first fixed teeth 103 of the output gear 32, even though the motor M is driven and the output shaft 42 is rotated with the first clutch device 100 engaged, the output shaft 42 only idles in the first needle roller bearing 101 disposed at the center portion of the output gear 32, so that the torque from the motor M is not transmitted to the output gear 32. Accordingly, kinetic energy of the axle shaft 20 and the differential casing 10 is also not transmitted to the motor 40.

Meanwhile, a disc 50 for auxiliary braking is fastened to be simultaneously rotatable to a second side of the differential casing 10.

A second clutch device 200 which may be engaged and disengaged is disposed between the disc 50 and the differential casing 10, and similar to the first clutch device, may have a clutch structure called a dog clutch or a disconnector.

Figure 6:
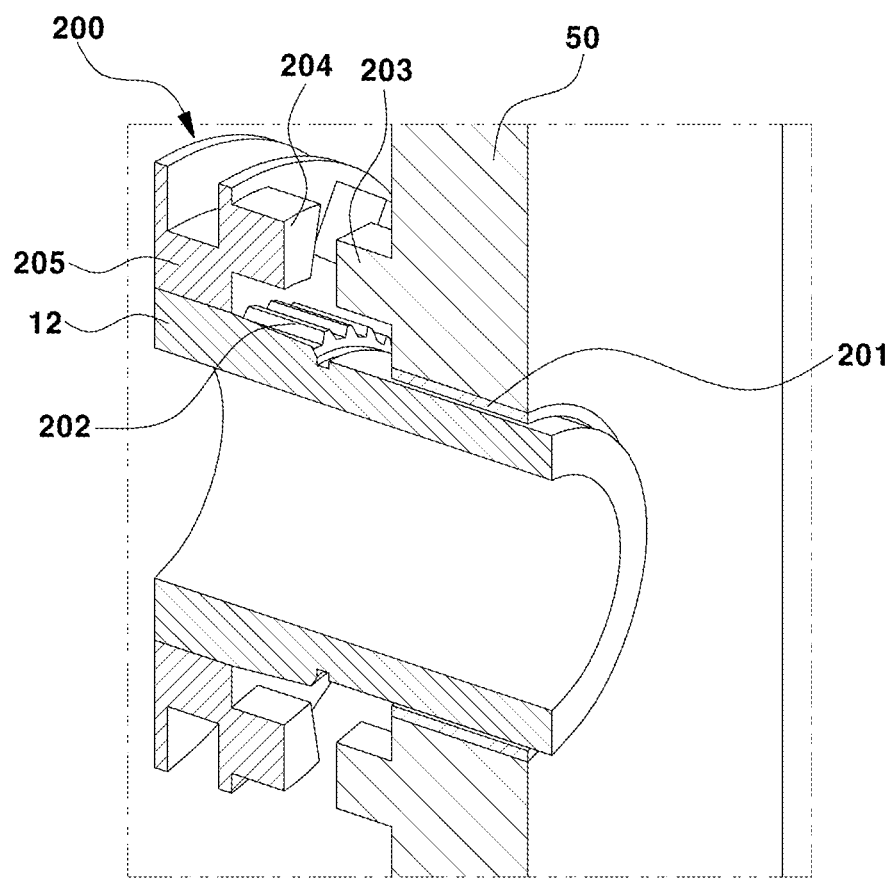
FIG. 6 is a cross-sectional perspective view showing the second clutch device of the components of the electric-axle device configured for a commercial vehicle according to various exemplary embodiments of the present invention.
Figure 7:
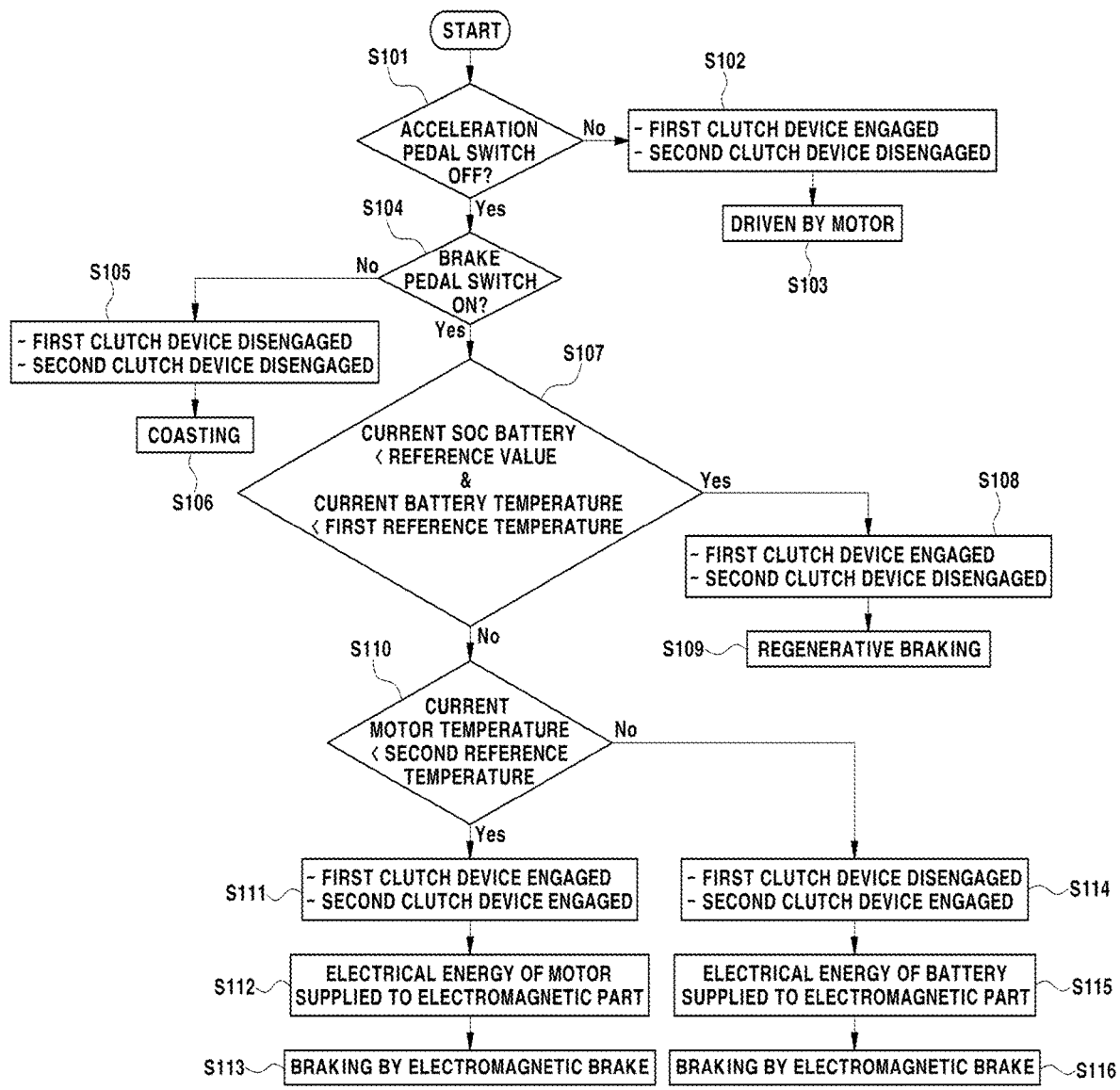
FIG. 7 is a flowchart showing an example of the operation of the electric-axle device configured for a commercial vehicle according to various exemplary embodiments of the present invention.

In more detail, the second clutch device 200, as shown in FIG. 6, includes: a second needle bearing 201 disposed at the center portion of the disc 50; a connection shaft 12 having a first end portion integrated with the second side of the differential casing 10 and a second end portion inserted into the second needle roller bearing 201 and having a second spline 202 on the external surface; second fixed teeth 203 protruding on the internal surface of the disc 50; and a second clutch body 205 having second protrusive moving teeth 204 on the external surface, which may be engaged with the second fixed teeth 203, and fitted on the second spline 202 to be configured to straightly move.

A second actuator 206 which is driven to straightly move the second clutch body 205 is connected to the second clutch body 205.

Substantially, a plunger which is the output shaft of the second actuator 206 is connected to the second clutch body 205, so when the plunger is moved forward or backward by operation of the second actuator 206, the second clutch body 205 is also moved forward or backward thereof.

Accordingly, when the plunger of the second actuator 206 is moved forward, the second clutch body 205 is moved forward and the second moving teeth 204 of the second clutch body 205 are engaged with the second fixed teeth 203 of the disc, whereby the second clutch device 200 may be engaged.

When the differential casing 10 is rotated with the second clutch device 200 engaged, the second clutch body 205 spline-coupled to the second spline 202 of the connection shaft 12 of the differential casing 10 and the disc 50 engaged with the second clutch body 205 are rotated together.

On the other hand, when the plunger of the second actuator 206 is moved backward, the second clutch body 205 is moved backward and the second moving teeth 204 of the second clutch body 205 are disengaged from the second fixed teeth 203 of the disc 50, whereby the second clutch device 200 may be disengaged.

Since the second moving teeth 204 of the second clutch body 205 have been disengaged from the second fixed teeth 203 of the disc 50, even though the differential casing 10 is rotated with the second clutch device 200 engaged, the connection shaft 12 of the differential casing 10 only idles in the second needle bearing 201 disposed at the center portion of the disc 50 and kinetic energy of the axle shaft 20 and the differential casing 10 is not transmitted to the disc 50, so that the disc 50 is maintained in the non-rotating state.

An electromagnetic brake 300 is disposed around the disc 50 to brake the disc 50. The electromagnetic brake 300 brakes the disc 50, if necessary, with the second clutch device 200 engaged.

The electromagnetic brake 300 may be a kind of eddy current brake that brakes the disc 50 by generating an eddy current in the disc 50 and Lorenz force in the opposite direction to the rotation direction of the disc 50 when the disc 50 which is a conductor rotates in a magnetic field.

To the present end, the electromagnetic brake 300 may include: an electromagnetic portion 301 which is partially fitted on the external surface of the disc 50 and generates a magnetic field to brake the disc 50; and a current controller 302 that supplies a current for generating a magnetic field to the electromagnetic portion 302 using electrical energy generated by the motor M or electrical energy of the battery 60.

Accordingly, when the differential casing 10 and the disc 50 are rotated with the second clutch device 200 engaged and a current for generating a magnetic field is supplied to the electromagnetic portion 301 from the current controller 302, a magnetic field is generated by the electromagnetic portion 302 and the disc 50 which is a conductor is rotated in the magnetic field. Furthermore, an eddy current is generated in the disc 50 and Lorenz force is generated in the opposite direction to the rotation direction of the disc 50 by electromagnetic induction, whereby the disc 50 may be braked.

Meanwhile, the electric-axle device configured for a commercial vehicle of the present invention may further include a battery 60 connected to the motor M to be configured to be charged and discharged and connected to the electromagnetic brake 300 to be configured to be discharged; and a controller 70 engaging or disengaging the first clutch device 100 and the second clutch device 200 and controlling operation of the electromagnetic brake 300.

The controller 70 may include a motor control unit (MCU) managing and controlling general state, operation, etc. of the motor, a battery management unit (BMS) managing a general state, the SOC, etc. of the battery, a vehicle control unit (VCU) which is an upper controller communicating with the MCU and the BMS and managing and controlling a vehicle, etc., and may be a single integrated controller. The controller 70 is referred to as a controller to clearly describe and understand the present invention.

The operation flow of the electric-axle device configured for a commercial vehicle of the present invention having the configuration described above is described hereafter.

First, whether an accelerator pedal has been turned on or off is determined (S101).

When the controller 70 receives an on-signal of the acceleration pedal, it is determined that a driver intends to accelerate by pressing down the accelerator pedal is determined, so that the first clutch device 100 is engaged and the second clutch device 200 is disengaged (S102).

To the present end, when the accelerator pedal is turned on, the controller 70 applies a driving control signal for engaging the first clutch device 100 to the first actuator 106 to drive the motor configured for driving and applies a driving control signal for disengaging the second clutch device 200 to the second actuator 206.

Accordingly, as described above, when the plunger of the first actuator 106 is moved forward, the first clutch body 105 is moved forward and the first moving teeth 104 of the first clutch body 105 are engaged with the first fixed teeth 103 of the output gear 32, whereby the first clutch device 100 may be engaged.

When the motor M is driven and the output shaft 42 is rotated with the first clutch device 100 engaged, the first clutch body 105 spline-coupled to the first spline 102 and the output gear 32 coupled to the first clutch body 105 are also rotated, whereby torque from the output gear 32 is transmitted to the differential casing 10 through a driving gear 34.

On the other hand, when the plunger of the second actuator 206 is moved backward, the second clutch body 205 is moved backward and the second moving teeth 204 of the second clutch body 205 are disengaged from the second fixed teeth 203 of the disc 50, whereby the second clutch device 200 may be disengaged.

Since the second moving teeth 204 of the second clutch body 205 have been disengaged from the second fixed teeth 203 of the disc 50, even though the differential casing 10 is rotated with the second clutch device 200 engaged, the connection shaft 12 of the differential casing 10 only idles in the second needle bearing 201 disposed at the center portion of the disc 50 and kinetic energy of the axle shaft 20 and the differential casing 10 is not transmitted to the disc 50, so that the disc 50 is maintained in the non-rotating state.

Accordingly, when the accelerator pedal switch is turned on, the first clutch device 100 and the second clutch device 200 are disengaged, so power by operation of the motor is finally transmitted to the differential casing 10 and the axle shaft 20, whereby acceleration by the operation of the motor may be achieved (S103).

When the accelerator pedal switch has been turned off as the result of determination in S101, whether the brake pedal switch has been turned on is determined (S104).

The controller 70 determines that the vehicle is coasting when receiving an off-signal of the brake pedal switch and an off-signal of the accelerator pedal switch.

When the vehicle coasts, the controller 70 sends a driving control signal for disengaging the first clutch device 100 to the first actuator 106 and a driving control signal for disengaging the second clutch device 200 to the second actuator 206.

When receiving an off-signal of the accelerator pedal switch and an off-signal of the brake pedal switch, the controller 70 determines that the vehicle is coasting and disengages the first clutch device 100 and the second clutch device 200 (S105).

As described above, when the plunger of the first actuator 106 is moved backward, the first clutch body 105 is moved backward and the first moving teeth 104 of the first clutch body 105 are disengaged from the first fixed teeth 103 of the output gear 32, whereby the first clutch device 100 may be disengaged.

Since the first moving teeth 104 of the first clutch body 105 have been disengaged from the first fixed teeth 103 of the output gear 32, even though the motor M is driven and the output shaft 42 is rotated with the first clutch device 100 engaged, the output shaft 42 only idles in a first needle roller bearing 101 disposed at the center portion of the output gear 32, so that the torque from the motor M is not transmitted to the output gear 32. Accordingly, kinetic energy of the axle shaft 20 and the differential casing 10 is also not transmitted to the motor 40.

Furthermore, even though the differential casing 10 is rotated with the second clutch device 200 disengaged, kinetic energy of the axle shaft 20 and the differential casing 10 is not transmitted to the disc 50, so that the disc 50 is maintained in the non-rotating state.

Accordingly, as the first clutch device 100 and the second clutch device 200 are disengaged, coasting may be performed (S106).

In more detail, as the first clutch device 100 and the second clutch device 200 are disengaged, kinetic energy transmitted to the motor M from the axle shaft 20 and the differential casing 10 is blocked like when the neutral gear of a transmission is engaged, so coasting may be easily performed. Since the resistance of the motor may be removed when the vehicle coasts, the coasting distance may be increased, energy efficiency may be improved, and durability of the motor may be increased.

When the brake pedal switch has been turned on as the result of determination in S104, it is determined that a driver intends to brake, and the reference value (the available maximum SOC value of the battery for charging) is compared with the SOC value of the battery are compared and the battery temperature and the first reference temperature (the available battery temperature for charging) are compared to determine whether the battery may be charged by regenerative braking of the motor (S107).

To the present end, in regenerative braking of the motor, the controller 70 applies a driving control signal for engaging the first clutch device 100 to the first actuator 106 and applies a driving control signal for disengaging the second clutch device 200 to the second actuator 206.

In more detail, the controller 70 compares the SOC value of the battery with the reference value (the available maximum SOC value of the battery for charging) and compares the battery temperature with the first reference temperature (the available battery temperature for charging) to determine whether the battery may be charged by regenerative braking of the motor. When the SOC value of the battery is less than the reference value and the battery temperature is less than the first reference temperature, the controller 70 sends a driving control signal for engaging the first clutch device 100 to the first actuator 106 and sends a driving control signal for engaging the second clutch device 200 to the second actuator 206, for regenerative braking of the motor.

Accordingly, when the SOC value of the battery is less than the reference value and the battery temperature is less than the first reference temperature as the result of determination in S107, it is determined that the battery may be charged by regenerative braking of the motor and the first clutch device 100 is engaged and the second clutch device 200 is disengaged on the basis of the driving control signals from the controller (S108).

As described above, when the battery may be charged by regenerative braking of the motor with the brake pedal switch turned on, regenerative braking of the motor is normally performed on the basis of engagement of the first clutch device 100 and the second clutch device 200 (S109), whereby the battery may be charged by regenerative braking of the motor.

On the other hand, when the SOC value of the battery is the reference value or more or the battery temperature is the first reference temperature or higher as the result of determination in step S107, it is determined that battery cannot be charged by regenerative braking of the motor and it is checked whether the battery can generate power.

To the present end, the controller 70 compares the current motor temperature with a second reference temperature (the maximum available temperature for operating the motor) to check whether the battery can generate power.

When the SOC value of the battery is the reference value or more, the battery temperature is the first reference temperature or higher, and the motor temperature is less than the second reference temperature, as the result of comparison, the controller 70 determines that the motor cannot be charged by regenerative braking of the motor, but the motor M can generate power.

Accordingly, the electrical energy generated by the motor M operating to generate power may be consumed by the electromagnetic brake 300.

To the present end, when the motor cannot perform regenerative braking but can generate power in braking (with the brake pedal switch turned on), the controller 70 sends a driving control signal for engaging the first clutch device 100 to the first actuator and sends a driving control signal for engaging the second clutch device 200 to the second actuator 206 such that a control signal for supplying the electrical energy generated by the motor M to the electromagnetic portion 301 of the electromagnetic brake 300 is sent to the current controller 302.

Accordingly, the first clutch device 100 is engaged and the second clutch device 200 is also engaged, as described above, on the basis of the driving signals from the controller 70 (S111).

Accordingly, kinetic energy by a rotation of the axle shaft 20 and the differential casing 10 is transmitted to the motor M with the first clutch device 100 engaged, whereby the motor M operates to generate power and electrical energy may be generated by the operation of the motor 40.

When the differential casing 10 is rotated with the second clutch device 200 engaged, the disc 50 is also rotated.

Furthermore, the controller 70 sends a control signal for supplying the electrical energy generated by the motor M to the electromagnetic portion 301 of the electromagnetic brake 300 to the current controller 302.

The current controller 302 supplies a current for generating a magnetic field to the electromagnetic portion 301 using the electrical energy generated by the motor M (S112).

Accordingly, the electromagnetic brakes 300 brakes the disc 50, as described above, using the electrical energy generated by the motor M (S113).

That is, as described above, a magnetic field is formed by the electromagnetic portion 301 and the disc 50 which is a conductor is rotated in the magnetic field. Furthermore, an eddy current is generated in the disc 50 and Lorenz force is generated in the opposite direction to the rotation direction of the disc 50 by electromagnetic induction, whereby the disc 50 may be braked.

Furthermore, as the disc 50 is braked, the differential casing 10 and the axle shaft 20 rotating with the disc 50 are also braked.

As described above, when the motor cannot perform regenerative braking but can generate power while the vehicle is braked, the electromagnetic brake 300 which is a kind of auxiliary brake performs braking by the electrical energy generated by the motor, wherein the amount of braking for the main brake (e.g., hydraulic brake) may be decreased and the frequency of using the main brake may be minimized. Furthermore, the durability of the main brake and the brake pad may be increased.

Furthermore, since the electrical energy generated by the motor M may be consumed by the electromagnetic brake 300, it is not required to use a resistor or electric accessories that are used, and accordingly, it is possible to increase the durability of the electric accessories.

When the motor temperature is the second reference temperature or higher, as the result of comparison in S110, the controller 70 determines that the motor M cannot generate power.

Accordingly, power for braking of the electromagnetic brake 300 may be supplied from the battery.

To the present end, when the motor cannot perform regenerative braking and cannot generate power in braking, the controller 70 sends a driving control signal for disengaging the first clutch device 100 to the first actuator and sends a driving control signal for engaging the second clutch device 200 to the second actuator 206 such that a control signal for supplying the electrical energy of the battery 60 to the electromagnetic portion 301 of the electromagnetic brake 300 is sent to the current controller 302.

Accordingly, the first clutch device 100 is disengaged and the second clutch device 200 is engaged, as described above, on the basis of the driving signals from the controller 70 (S114).

Accordingly, the kinetic energy of the axle shaft 20 and the differential casing 10 is not transmitted to the motor M with the first clutch device 100 disengaged, so that the motor M becomes under no load and may be decreased in temperature under the second reference temperature through artificial or natural cooling.

When the differential casing 10 is rotated with the second clutch device 200 engaged, the disc 50 is also rotated.

Furthermore, the controller 70 sends a control signal for supplying the electrical energy of the battery 60 to the electromagnetic portion 301 of the electromagnetic brake 300 to the current controller 302.

The current controller 302 supplies a current for generating a magnetic field to the electromagnetic portion 301 using the electrical energy of the battery 60 (S115).

Accordingly, the electromagnetic brake 300 brakes the disc 50, as described above, using the electrical energy of the battery 60 (S113).

That is, as described above, a magnetic field is formed by the electromagnetic portion 301 and the disc 50 which is a conductor is rotated in the magnetic field. Furthermore, an eddy current is generated in the disc 50 and Lorenz force is generated in the opposite direction to the rotation direction of the disc 50 by electromagnetic induction, whereby the disc 50 may be braked.

Furthermore, as the disc 50 is braked, the differential casing 10 and the axle shaft 20 rotating with the disc 50 are also braked.

As described above, when the motor cannot perform regenerative braking and cannot generate power while the vehicle is braked, the electromagnetic brake 300 which is a kind of auxiliary brake performs braking by the electrical energy of the battery, wherein the amount of braking for the main brake (e.g., hydraulic brake) may be decreased and the frequency of using the main brake may be minimized. Furthermore, the durability of the main brake and the brake pad may be increased.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An electric-axle apparatus for a vehicle, the electric-axle apparatus comprising:
    a differential casing connected to an axle shaft;
    a motor selectively transmitting torque to the differential casing;
    a reducer disposed between the motor and the differential casing and engaged to the differential casing;
    a first clutch device mounted between the motor and the reducer and configured to selectively engage the motor to the reducer;
    a disc rotatably engaged directly to the differential casing to rotate with the differential casing;
    a second clutch device disposed between the disc and the differential casing and configured to selectively engage the disc to the differential casing;
    an electromagnetic brake configured for braking the disc, wherein the electromagnetic brake selectively brakes the disc with the second clutch device engaged to the disc; and
    a battery electrically connected to the motor to be charged by the motor or discharged to the motor, and electrically connected to the electromagnetic brake to be discharged to the electromagnetic brake.

2. The electric-axle apparatus of claim 1, wherein the reducer includes:
    an output gear engaged directly to an output shaft of the motor; and
    a driving gear mounted on the differential casing and engaged directly with the output gear.

3. The electric-axle apparatus of claim 1, wherein the first clutch device includes:
    an output shaft fixed to the motor and having an end portion slidably inserted into the output gear and a first spline on an external surface of the output shaft;
    first fixed teeth formed on an internal surface of the output gear;
    a first clutch body having first moving teeth on an external surface of the first clutch body, wherein the first clutch body is fitted on the first spline to straightly move along the first spline so that the first moving teeth of the first clutch body is selectively engaged with the first fixed teeth of the output gear; and
    a first actuator engaged to the first clutch body and configured to be selectively driven to straightly move the first clutch body along the first spline.

4. The electric-axle apparatus of claim 3,
    wherein the first clutch device further includes a first needle bearing disposed at a center portion of the output gear of the reducer, and
    wherein the end portion of the output shaft is slidably inserted into the first needle bearing.

5. The electric-axle apparatus of claim 1, wherein the second clutch device includes:
    a connection shaft having a first end portion integrated with the differential casing and a second end portion having a second spline on an external surface of the second end portion;
    second fixed teeth formed on an internal surface of the disc;
    a second clutch body having second moving teeth on an external surface of the second clutch body, wherein the second clutch body is fitted on the second spline to straightly move along the second spline so that the second moving teeth of the second clutch body is selectively engaged with the second fixed teeth of the disc; and
    a second actuator engaged to the second clutch body and selectively driven to straightly move the second clutch body along the second spline.

6. The electric-axle apparatus of claim 5,
    wherein the second clutch device further includes a second needle bearing disposed at a center portion of the disc, and
    the second end portion of the connection shaft is slidably inserted into the second needle roller bearing.

7. The electric-axle apparatus of claim 1, wherein the electromagnetic brake includes:
    an electromagnetic portion partially fitted on an external surface of the disc and configured for selectively generating a magnetic field to brake the disc; and
    a current controller electrically connected to the electromagnetic portion and configured for supplying a current to the electromagnetic portion for generating the magnetic field in the electromagnetic portion using electrical energy generated by the motor or electrical energy of the battery.

8. The electric-axle apparatus of claim 1, further including a controller configured for controlling operation of the first clutch device and the second clutch device and controlling operation of the electromagnetic brake.

9. The electric-axle apparatus of claim 8,
wherein the controller is electrically connected to a first actuator and a second actuator and configured to send a driving control signal to the first actuator for engaging the first clutch device by the first actuator and to send a driving control signal to a second actuator for disengaging the second clutch device by the second actuator, upon concluding that the motor is operated for driving and performs regenerative braking.

10. The electric-axle apparatus of claim 9,
wherein the controller electrically connected to an accelerator pedal switch is configured to send a driving control signal to the first actuator for engaging the first clutch device by the first actuator and to send a driving control signal to the second actuator for disengaging the second clutch device by the second actuator, to operate the motor upon concluding that the accelerator pedal switch is turned on.

11. The electric-axle apparatus of claim 9,
wherein the controller is configured to send a driving control signal to the first actuator for engaging the first clutch device by the first actuator and to send a driving control signal to the second actuator for disengaging the second clutch device by the second actuator for the regenerative braking of the motor upon concluding that a state of charge (SOC) value of the battery is less than a reference value and a battery temperature is less than a first reference temperature.

12. The electric-axle apparatus of claim 8,
wherein the controller is electrically connected to a first actuator and a second actuator and configured to send a driving control signal to the first actuator for disengaging the first clutch device by the first actuator and to send a driving control signal to the second actuator for disengaging the second clutch device by the second actuator, upon concluding that the vehicle coasts.

13. The electric-axle apparatus of claim 12,
wherein the controller electrically connected to a brake pedal switch and an accelerator pedal switch is configured to conclude that the vehicle is coasting upon receiving an off-signal of the brake pedal switch and an off-signal of the accelerator pedal switch.

14. The electric-axle apparatus of claim 8,
wherein the controller is electrically connected to a first actuator and a second actuator and configured to send a driving control signal to the first actuator for engaging the first clutch device by the first actuator, to send a driving control signal to the second actuator for engaging the second clutch device by the second actuator, and to send a control signal to a current controller electrically connected to the controller and an electromagnetic portion of the electromagnetic brake for supplying electrical energy generated by the motor to the electromagnetic portion of the electromagnetic brake, upon concluding that the motor cannot perform regenerative braking but is configured to generate power in braking.

15. The electric-axle apparatus of claim 14,
wherein the controller is configured to conclude that the motor cannot perform the regenerative braking but is configured to generate the power, upon determining that a state of charge (SOC) value of the battery is equal to or greater than a reference value or a battery temperature is equal to or greater than a first reference temperature and a motor temperature is less than a second reference temperature.

16. The electric-axle apparatus of claim 8,
wherein the controller is electrically connected to a first actuator and a second actuator and configured to send a driving control signal to the first actuator for disengaging the first clutch device by the first actuator, to send a driving control signal to the second actuator for engaging the second clutch device by the second actuator, and to send a control signal to a current controller electrically connected to the controller and an electromagnetic portion of the electromagnetic brake for supplying electrical energy of the battery to the electromagnetic portion of the electromagnetic brake, upon concluding that the motor cannot perform regenerative braking and cannot generate power in braking.

17. The electric-axle apparatus of claim 16,
wherein the controller is configured to conclude that the motor cannot perform the regenerative braking and cannot generate the power upon determining that a state of charge (SOC) value of the battery is equal to or greater than a reference value or a battery temperature is equal to or greater than a first reference temperature and a motor temperature is equal to or greater than a second reference temperature.

18. An electric-axle apparatus for a vehicle, the electric-axle apparatus comprising:
a differential casing connected to an axle shaft;
a motor selectively transmitting torque to the differential casing;
a reducer disposed between the motor and the differential casing and engaged to the differential casing;
a first clutch device mounted between the motor and the reducer and configured to selectively engage the motor to the reducer;
a disc rotatably engaged directly to the differential casing to rotate with the differential casing;
a second clutch device disposed between the disc and the differential casing and configured to selectively engage the disc to the differential casing;
an electromagnetic brake configured for braking the disc, wherein the electromagnetic brake optionally selectively brakes the disc with the second clutch device engaged to the disc; and
a battery electrically connected to the motor to be charged by the motor or discharged to the motor, and electrically connected to the electromagnetic brake to be discharged to the electromagnetic brake, and
a controller configured for controlling operation of the first clutch device and the second clutch device and controlling operation of the electromagnetic brake depending on a state of charge (SOC) value of the battery or depending on whether the battery is charged by regenerative braking of the motor.

* * * * *